United States Patent [19]

Di Drusco et al.

[11] 4,431,696

[45] Feb. 14, 1984

[54] MANUFACTURED ARTICLES BASED ON THERMOPLASTIC POLYMERS REINFORCED WITH GLASS FIBERS

[75] Inventors: Giovanni Di Drusco; Antonio Chiolle; Sergio Danesi, all of Ferrara; Lino Credali, Casalecchio di Reno, all of Italy

[73] Assignee: Montedison S.p.A., Milan, Italy

[21] Appl. No.: 260,814

[22] Filed: May 5, 1981

[30] Foreign Application Priority Data

May 6, 1980 [IT] Italy ............................... 21818 A/80

[51] Int. Cl.$^3$ ................................................ B32B 7/02
[52] U.S. Cl. .................................. 428/212; 162/157.5; 264/13; 428/294; 428/114; 428/516; 428/303; 428/339
[58] Field of Search ............... 428/212, 294, 114, 516, 428/303, 239; 264/13; 162/157 R

[56] References Cited

U.S. PATENT DOCUMENTS

| | | | |
|---|---|---|---|
| 3,691,000 | 9/1972 | Kalnin .................................. | 428/114 |
| 3,700,538 | 10/1972 | Kennedy ............................. | 428/241 |
| 3,834,832 | 9/1974 | Mallinder ............................ | 428/114 |
| 4,250,221 | 2/1981 | Pfeffer ................................. | 428/294 |

*Primary Examiner*—George F. Lesmes
*Assistant Examiner*—E. Rollins Buffalow

[57] ABSTRACT

Polymeric articles filled with glass fibers are prepared by methods used in paper making, starting from aqueous dispersions of glass fibers with polyolefinic fibrils having a high surface area, by deposition in sheets, drying and pressure-molding, optionally after bonding the sheets in a sandwich-like manner with an intermediate thermoplastic polymeric plate, not containing glass fibers, and having a modulus of flexure lower than that of the glass fibers contained in such sheets, so as to thermoweld said plate to the sheets.

1 Claim, No Drawings

MANUFACTURED ARTICLES BASED ON THERMOPLASTIC POLYMERS REINFORCED WITH GLASS FIBERS

BACKGROUND OF THE INVENTION

It is known to enhance the mechanical properties of the manufactured articles based on polymeric plastic material by incorporating therein reinforcing fibrous materials endowed with a high elastic flexural modulus, such as fibers of glass, of cellulose, of asbestos, of carbon, etc.

Methods employed for preparing articles so reinforced are those based on pressure-injection of mixtures of molten polymer and fibers, which however are suitable for preparing small-size articles and involve non-homogeneity of the article reinforcement in its area of greatest bending; or are the methods consisting in the impregnation of fiber layers with polymeric latexes followed by hot molding of the resulting panels. In the latter case, the fibrous material is predominantly located in the central area of the article and does not contribute to the reinforcement.

Furthermore, a defect common to both methods is that the surface of the article has an esthetically flawed finish, due to the fact that the fibrous material appears on the surface, which flaw is favored by the molding operation.

THE PRESENT INVENTION

One object of this invention is to provide a method for preparing manufactured articles comprising thermoplastic polymers reinforced with glass fibers which does not have the drawbacks and disadvantages of the known processes.

Another object is to provide manufactured articles comprising thermoplastic polymers reinforced with glass fibers, the reinforcing fibers being fully homogeneously distributed throughout the articles, the surfaces of which have a smooth and attractive finish.

These and other objects are achieved by the present invention which provides a process comprising the following steps:

(a) preparing a mixture, in an aqueous dispersion or in an inert liquid medium, of glass fibers longer than 1 mm, with fibrils or fibrids of at least one olefinic thermoplastic polymer, which fibrils or fibrids have a surface area of at least 1 $m^2/g$, the glass fibers/fibrils weight ratio ranging from 3/97 to 95/5;

(b) forming a sheet by depositing the dispersion on a porous surface, whereby there is a substantial removal of the liquid medium, with consequent deposition of the glass fibers onto a plane substantially parallel to the principal plane of the sheet;

(c) drying the sheet;

(d) heating the sheet at a temperature equal to or higher than the melting temperature of the olefinic polymer forming the fibrils, or of the olefinic polymer having the highest melting temperature among those constituting the fibrils, with application of pressure for a time-period sufficient to melt said fibrils.

The term "fibrils" or "fibrids", as used herein, generally means fibrous structures endowed with a morphology similar to that of cellulose fibers, having an appearance sometimes also pellicular besides tubular, the length of which is generally comprised between 0.5 and 50 mm and the apparent (mean) diameter, or smaller dimension, of which ranges from 1 to 500$\mu$.

Fibrils or fibrids having a surface area equal to or higher than 1 $m^2/g$ are known and are mostly employed as partial or total substitutes for the cellulose fibers in the manufacture of paper or of related products.

They can be prepared according to various methods described in the literature.

According to British Pat. No. 868,651, such structures can be prepared by adding a solution of a polymer to a non-solvent of the polymer, while simultaneously subjecting the precipitated polymer, or the swollen polymer, to the action of cutting strengths. A similar process is described, also, in German Patent Application No. 2,208,553.

According to British Pat. No. 1,287,917, structures having an analogous morphology are obtained by polymerizing alpha-olefins in the presence of coordination catalysts, under the action of cutting stresses exerted in the reaction medium.

Other processes by means of which fibrous structures having the characteristics and uses described above are obtained in the state of more or less coherent aggregates, or of fibrillar filament structures (plexifilaments), consist in extruding through an orifice solutions, emulsions, dispersions or suspensions of synthetic polymers in solvents, emulsifiers or dispersants, or mixtures thereof, under conditions of almost immediate evaporation of the solvent or of the existing liquid phase (flash-spinning processes).

Such processes are described, for example, in British Pat. Nos. 891,943 and 1,262,531, in U.S. Pat. Nos. 3,770,856, 3,740,383 and 3,808,091, in Belgian patent No. 789,808, in French patent No. 2,176,858 and in German patent application No. 2,343,543.

The fibrous aggregates or plexifilaments obtained according to such processes can be easily disgregated by cutting or refining, until there are obtained elementary fibrous structures, having a surface area of at least 1 $m^2/g$ and suitable for use in the manufacture of paper or of similar products.

British Pat. No. 891,945 describes, for example, how to prepare such plexifilament fibrids by disgregation of plexifilaments obtained by flash-spinning of polymeric solutions.

Finally, fibrils of fibrous structures having analogous applicative characteristics can be advantageously prepared by subjecting a solution, or a suspension, an emulsion or a dispersion of a polymer in solvents and/or emulsifiers or dispersants, while it is being extruded under conditions of quick evaporation of the liquid phase, to the cutting action of a gaseous fluid having a high velocity and directed angularly in respect of the extrusion direction.

Such kinds of processes are described in Italian Patent Nos. 947,919 and 1,030,809, assigned to Montedison S.p.A.

For the purposes of the present invention use is made of fibrils or fibrids of olefinic polymers, such as low or high density polyethylene, polypropylene, ethylene-propylene copolymers of the statistical or block type, poly-butene-1, and poly-4-methyl-1-pentene.

The preparation of the mixture of glass fibers and olefinic polymer fibrils can be easily effected by dispersing together the two types of fibers in an inert liquid, preferably water, under stirring, according to the methods usually employed in the technique for preparing pulps for paper. In this preparation, the dispersion of fibers, or of the polyolefinic fibrils, should preferably contain a wetting agent, in order to enhance their dispersibility in water and a thorough mixing of the polyolefinic fibrils with the glass fibers. Methods of rendering wettable the synthetic polymer fibers by addition of wetting agents are described in, for example, Belgian Patent No. 787,060 and in German Patent Application No. 2,208,553, as well as in Italian Patent No. 1,006,878, assigned to Montedison S.p.A.

Prior to the forming of the sheet, the fiber dispersion can be additioned also with cohesion agents, such as, for example, ureic, acrylic, and/or aminic resins, which facilitate the forming of the sheets, even sheets of the lowest possible weight.

The preparation of the sheet by means of the dispersion prepared in step (a) can be effected by the methods and the apparatuses utilized in the paper industry for preparing cellulose paper sheets, by which it is possible to easily attain an arrangement of the glass fibers in the sheet on a substantially horizontal plane, or on a plane parallel to the sheet plane.

When forming the sheet, the excess liquid contained in the fiber mixture can be removed, besides by gravity, by suction under vacuum, which promotes the stabilization of the orientation assumed by the glass fibers in the feeding direction of the dispersion to the porous surface, or in the direction of the liquid streams of the carrying liquid flow.

Drying of the sheet in step (c) can be effected according to technologies conventionally used in the paper industry (on cylinders, belts, nets, etc.,) and is preferably conducted up to a dry content in the sheet close to 100%.

Heating step (d) can be carried out under pressure, continuously in a calender, or discontinuously in a plate press. Preferably, the sheet is heated at a temperature higher than the melting temperature of the thermoplastic fibrils present therein, in the absence of pressure, and by successively cooling the sheet under pressure in a cold press or in molds.

Generally it is possible to obtain a sheet or film having a compact, non-porous structure, in which the pre-existing polymeric fibrils are no longer identifiable.

This invention also provides a process for preparing articles from thermoplastic material, according to which at least two sheets obtained from step (b) or (c) are laid to form a "sandwich", prior to heating step (d), on the two faces of a lamina of a thermoplastic polymer, free or substantially free from incorporated glass fibers, and are then subjected to heating step (d) while they lie on such lamina, at a temperature at least equal to the softening point of the thermoplastic polymer constituting such lamina, for a time-period sufficient to cause the melting of the fibrils and the adhesion of the lamina to the sheets.

In such case, the thermoplastic polymer constituting the lamina possesses a flexural modulus lower than the one of the glass fibers existing in the sheets, and is compatible with the olefinic polymer constituting the fibrils employed.

By saying that the thermoplastic polymer constituting the lamina is substantially free from glass fibers we mean that such fibers may be optionally present, but only in such amounts as not to essentially modify the value of the flexural modulus of the polymer in itself, for example by not more than 10% of such value.

Some examples of polymers useful in preparing such lamina are: polyethylene, polypropylene, ethylene-propylene copolymers, polystyrene, polyurethanes, styrene-butadiene-acrylonitrile terpolymers, or mixtures thereof.

The internal structure of the utilized lamina can be either compact, or cellular or expanded. Preferably, the polymer or the polymeric material constituting it has melting temperatures in the range of from 135° to 172° C.

Thus there are obtained polymeric manufactured articles containing a glass fiber reinforcement consisting of, or comprising, a structure made up of three compact layers, two of which are prepared from an olefinic polymer with incorporated glass fibers, and are thermowelded to the third layer which is intermediate in respect of them, which is prepared from a thermoplastic polymer compatible with the olefinic polymer of the other two layers, is entirely or substantially free of incorporated glass fibers and possesses a flexural modulus lower than that of the glass fibers contained in the other two layers.

Such articles reveal—the incorporated glass fibers content, shape and total thickness being the same—mechanical properties, especially flexibility and impact resistance, by far higher than those of the articles prepared from analogous polymers, in which the fiber filling is homogeneously dispersed in the whole mass of the article, or prevailingly in the inside of such mass.

Practically, the complete process for preparing such composite or stratified articles comprises the following consecutive steps:

(A) preparing a mixture in an aqueous dispersion, or in another inert liquid, of glass fibers having a length exceeding 1 mm with fibrils or fibrids of at least one olefinic thermoplastic polymer, endowed with a surface area of at least 1 $m^2/g$, with a glass fibers/fibrils weight ratio ranging from 3/97 to 95/5;

(B) forming a sheet by depositing such dispersion on a porous surface—whereby there is a substantial elimination of the liquid medium—with an arrangement of the glass fibers on a plane substantially parallel to the principal plane of the sheet;

(C) drying such sheet;

(D) "sandwich" laying at least two of such sheets on a lamina of a thermoplastic polymer consistent with the olefinic polymer constituting the fibrils, substantially free from incorporated glass fibers, having a modulus of flexure lower than that of the glass fibers present in the aforesaid sheets, by deposition of such sheets onto the faces of such lamina;

(E) heating the sheets, at a temperature equal to the melting temperature of the olefinic polymer constituting the fibrils existing in the sheets, and at last equal to the softening temperature of the thermoplastic polymer constituting the lamina, by application of pressure, for a time sufficient to cause the melting of such fibrils and an at least superficial softening of the lamina, with consequent adhesion of such sheets to the lamina.

Drying step (C) can represent an operation not separated from bonding step (D), and can be carried out during or after the bonding of the sheets with the polymeric lamina, prior to heating step (E) of the whole body.

Step (D) can be easily carried out, for example by preparing the lamina by extrusion between two sheets obtained from step (C) or (B). Successively, step (E) can be carried out by heating the bonded article under pressure, for example in a plate press.

Thus the present invention also provides manufactured articles made of thermoplastic polymers, consisting of, or comprising, a three-layer structure, two of such layers being prepared from an olefinic polymer containing incorporated 3 to 95% by weight of glass fibers longer than 1 mm, substantially arranged on a plane parallel with the principal plane of each layer, such two layers being thermowelded to the third layer which is intermediate to same and is prepared from a thermoplastic polymer compatible with the olefinic polymer of the other two layers, is substantially free from incorporated glass fibers and possesses a flexural modulus lower than that of the glass fibers existing in the other two layers.

The following examples are given to illustrate the present invention, and are not intended to be limiting.

EXAMPLE 1

Preparation of polyethylene sheets containing glass fibers as reinforcement

In a mixer, there was prepared an aqueous dispersion of 7 kg of high density-polyethylene fibrils (M.I.=7, M.T.=135° C.), exhibiting a surface area of 6 m²/g, and pretreated with acetalized polyvinyl alcohol according to the method described in Italian patent No. 1,006,878, with 3 kg of glass fibers having a length of 6 mm, a diameter of about 14μ, a density of 2.54 g/cc and a flexural modulus of about 826,000 kg/cm².

Such dispersion was diluted with water to a volume of 1,000 liters and then refined in an open-blade conical refiner for 25 minutes. After refining, the glass fibers had an average length of about 4 mm. The suspension was then further diluted to a fiber concentration of 5 g/l and transformed into a sheet on a continuous paper-making machine, at a speed of 40 m/minute.

After pressing and drying at 120° C. for 5 minutes, the sheet so obtained [sheet (a)] was calendered at a temperature ranging on the average from 135° to 150° C. under a pressure of 90 kg/cm² for 15 seconds, at a speed of 4 m/minute, thereby obtaining a sheet or film of compact structure.

Operating in the same manner, but using fibrils of polyethylene having a M.I. of 0.3 and 5 respectively, and a melting temperature of 135° C., two other sheets, (b) and (c), were prepared which, after calendering under the conditions employed for about (a), appeared as sheets or films of compact structure.

The characteristics of the three products after calendering are recorded in Table I.

Preparation of a layer-structure according to this invention

Utilizing a plate press, which operated at a pressure of 5-20 kg/cm² and at a temperature of 150° C., 7 layer-structures were prepared by causing to adhere, to the two main faces of a plate made of high density polyethylene (M.T.=5, melting temperature=135° C.), having a flexural modulus of 17,000 kg/cm² and a thickness of about 1.3 mm, in an equal amount on each face, an increasing number of previously prepared sheets of type (a) and (b) respectively.

The properties of the structures so obtained are recorded in Table II.

EXAMPLE 2 (Comparative Test)

Polyethylene of the type utilized for preparing sheet (a) of the preceding example was mixed with 30% by weight (referred to the mixture) of glass fibers like those used in said example. The mixture was extruded at 205° C. in a double screw extruder Pasquetti and the extruded produce was granulated for being then transformed into small plates by treatment for 5 minutes at 180° C. in a plate press.

The same granulate was also used to prepare a plate by pressure injection at 225° C. in a pressure injection type GBF. The characteristics of the plates are recorded in Table III.

EXAMPLE 3

Preparation of the layer-structures described in Example 1 was repeated, with the difference that a thermal treatment in the absence of pressure was first carried out, by placing the polyethylene lamina bonded to the sheets of type (a) and (b) in an oven at 180° C., and then transferring the whole into a cold-plate press operating at 200 kg/cm², for a time of 10 seconds.

The properties of the resulting structures are analogous with those of the layer-structures of Example 1.

EXAMPLE 4

Operating according to the same modalities and using the same kind of polyethylene fibrils and the same kind of glass fibers as used for sheet (a) of Example 1, sheets were prepared containing 50% by weight of glass fibers and having, after drying, the following characteristics:

| | |
|---|---|
| thickness | = 208 μ |
| weight | = 220 g/m² |
| density | = 1.07 g/cm³ |
| transversal tensile strength | = 1.40 kg |
| longitudinal tensile strength | = 1.95 kg. |

An increasing number of sheets was placed, in an equal amount, on the two faces of a high density polyethylene plate similar to the one of Example 1, and it was made to adhere according to the method employed in Example 3.

The properties of the multilayer structure so obtained are recorded in columns 1 and 2 of Table IV.

EXAMPLE 5

Example 4 was repeated, using a 1.3 mm-thick lamina of polyethylene having a M.I.=0.4 and a flexural modulus of 17,000 kg/cm², except that the sheets containing the glass fibers had been impregnated, prior to their bonding with the polyethylene lamina, with an aqueous solution containing 0.5% by weight of α-aminopropyl-triethoxysilane hydrolized at a pH=3.4 with acetic acid, and 1% of a derivative of maleic anhydride having the structure:

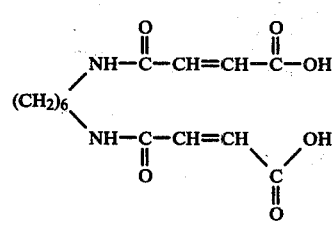

and successively dried.

The properties of the structures are reported in column 3 of Table IV.

TABLE I

| | Sheets | | | Characterization method |
|---|---|---|---|---|
| | (a) | (b) | (c) | |
| Sheet thickness (μ) | 195. | 208. | 305. | |
| Weight (g/m$^2$) | 185. | 192. | 219. | (1) |
| Density (g/cm$^3$) | 0.95 | 0.923 | 0.717 | |
| Longitudinal tensile strength (kg) | 4.46 | 4.79 | 3.36 | (2) |
| Transversal tensile strength (kg) | 3.24 | 3.88 | 2.60 | (2) |
| Longitudinal flexural rigidity (g/cm) | 57.1 | 39.3 | 44.9 | (3) |
| Transversal flexural rigidity (g/cm) | 48.1 | 30.8 | 37.0 | (3) |

(1) Tappi 420
(2) Tappi 494
(3) Tappi 489

TABLE II

| | Bonded article with use of sheets (a) | | | | | Bonded article with use of sheets (b) | | Measuring method |
|---|---|---|---|---|---|---|---|---|
| Total thickness of the sandwich-bonded article (cm) | 0.188 | 0.213 | 0.237 | 0.259 | 0.314 | 0.249 | 0.207 | |
| Total thickness of sheets on each face of the polyethylene plate (cm) | 0.0272 | 0.0400 | 0.0544 | 0.0800 | 0.0928 | 0.0656 | 0.0864 | |
| Total content of glass fibers in the bonded article (%) | 9.5 | 12.65 | 15.20 | 18.95 | 19.1 | 17.3 | 19.4 | |
| Flexural elasticity modulus (kg/cm$^2$) | 25,900 | 31,400 | 34,550 | 39,800 | 41,900 | 42,200 | 44,950 | (1) |
| Flexural tensile strength (kg/cm$^2$) | 329 | 394 | 413 | 480 | 484 | 541 | 731 | (2) |
| Density (g/cm$^3$) | 1023 | 1.041 | 1.058 | 1.090 | 1.085 | 1.075 | 1.090 | |
| Total energy of fracture (kg.cm/cm) | 133 | 162 | 126 | 202 | 194 | 194 | 256 | (3) |
| Creep resistance under load, at 80° C. and 60 kg/cm$^2$: deformation after 24 h (%) | 1.75 | 1.70 | 0.92 | 0.92 | 0.90 | 0.87 | 0.38 | (4) |
| Endurance strength (10$^3$ cycles) | 564 | 444 | 100 | 92 | 61 | 437 | 20 | (5) |
| Load at the beginning of proof (kg/cm$^2$) | 468 | 510 | 653 | 527 | 665 | 747 | 671 | |
| Load at the end of proof (kg/cm$^2$) | 304 | 312 | 407 | 309 | 432 | 293 | 162 | |

(1) ASTM-D-790
(2) ASTM-D-790
(3) "Ball drop" tests (biaxial impact) with constrained test piece; autographic ram; weight of the ram = 10.4 kg; height of fall = 1 m; resting ring 0 = 33; punch diameter = 12.6 mm.
(4) ASTM-D-2990
(5) Standards DIN 50142, on plane machine PWO-0310 "WEBI".

TABLE III

| | Method of preparing the plate | |
|---|---|---|
| | Pressure molding | Pressure injection |
| Fiber content (%) | 30 | 30 |
| Thickness (cm) | 0.179 | 0.296 |
| Density (g/cm$^3$) | 1.18 | 1.18 |
| Flexural elasticity modulus (kg/cm$^2$) | 24,920 | 37,550 |
| Flexural tensile strength (kg/cm$^2$) | 269 | 360 |
| Total energy of fracture (kg/cm/cm) | 119 | 198 |
| Creep resistance test under load at 80° C. and 60 kg/cm$^2$: deformation after 24 hours (%) | 1.44 | 1.55 |
| Endurance strength: No. of cycles × 10$^3$ | 477 | 36 |
| Load at beginning of proof (kg/cm$^2$) | 419 | 595 |
| Load at end of proof (kg/cm$^2$) | 322 | 284 |

TABLE IV

| | 1 | 2 | 3 |
|---|---|---|---|
| Total thickness of the multilayer structure (cm) | 0.161 | 0.272 | 0.272 |
| Total thickness of the sheets on each face of the plate (cm) | 0.018 | 0.065 | 0.065 |
| Total content of the glass fibers in the structure (%) | 17.3 | 31.3 | 31.3 |
| Flexural elasticity modulus (kg/cm$^2$) | 39,880 | 60,690 | 68,000 |
| Flexural tensile strength (kg/cm$^2$) | 495 | 709 | 1,000 |
| Density (g/cm$^3$) | 1.065 | 1.19 | 1.21 |
| Total energy of fracture (kg.cm/cm) | 273 | 319 | 417 |
| Creep resistance test under load, at 80° C. and 60 kg/cm$^2$: deformation after 24 hours (%) | 0.707 | 0.406 | 0.215 |

What is claimed is:

1. Manufactured articles based on thermoplastic polymers and consisting essentially of, a three-layer structure, two of the layers being prepared from fibrils of an olefinic polymer containing 3 to 95% by weight of glass fibers longer than 1 mm, and arranged on a plane substantially parallel to the principal plane of the layers, said two layers being thermowelded to the third layer which is intermediate in respect thereto, has a thickness of at least 0.09 cm., and is prepared from a thermoplastic polymer compatible with the olefinic polymer of the other two layers, is substantially free from incorporated glass fibers and possesses a flexural modulus lower than that of the glass fibers contained in the other two layers.

* * * * *